United States Patent
Coban et al.

(10) Patent No.: US 10,473,402 B2
(45) Date of Patent: Nov. 12, 2019

(54) HEAT EXCHANGER MODULE

(71) Applicant: Mahle International GmbH, Stuttgart (DE)

(72) Inventors: Adem Coban, Henndorf A. W. (AT); Gregory Deschamps, Montigny-le-Btx (FR); Kai-Torsten Schmiedl, Altdorf (DE); Abdul-Kadir Tarim, Mattighofen (AT)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/773,468

(22) PCT Filed: Oct. 28, 2016

(86) PCT No.: PCT/EP2016/076069
§ 371 (c)(1),
(2) Date: May 3, 2018

(87) PCT Pub. No.: WO2017/076766
PCT Pub. Date: May 11, 2017

(65) Prior Publication Data
US 2018/0320980 A1  Nov. 8, 2018

(30) Foreign Application Priority Data
Nov. 3, 2015  (DE) .................. 10 2015 221 528

(51) Int. Cl.
*F28D 9/00* (2006.01)
*F28F 9/007* (2006.01)
(Continued)

(52) U.S. Cl.
CPC ........... *F28D 9/005* (2013.01); *B01D 35/005* (2013.01); *B01D 35/18* (2013.01); *F01M 1/02* (2013.01);
(Continued)

(58) Field of Classification Search
CPC ........ B01D 35/005; B01D 35/18; F01M 1/02; F01M 1/002; F01M 1/03;
(Continued)

(56) References Cited

U.S. PATENT DOCUMENTS 4,370,957 A  2/1983  Skatsche et al.
5,647,306 A  7/1997  Pateman
(Continued)

FOREIGN PATENT DOCUMENTS

AT  506972 A4  1/2010
DE  19654362 A1  6/1998
(Continued)

OTHER PUBLICATIONS

English abstract for DE-19828029.
(Continued)

*Primary Examiner* — Keith M Raymond
*Assistant Examiner* — Gordon A Jones
(74) *Attorney, Agent, or Firm* — Fishman Stewart PLLC

(57) ABSTRACT

A heat exchanger module may include a heat exchanger device arranged on a base plate and configured to control the temperature of a fluid via a heat transfer medium. The module may also include at least one additional unit arranged on the base plate and structured as at least one of a pump and a filter device. Further, the module may include a fluid inflow duct, a fluid outflow duct, a medium inflow duct, and a medium outflow duct disposed in the base plate. The at least one additional unit may include at least one inflow line and at least one outflow line disposed in the base plate and fluidically separated from the other ducts disposed in the base plate. The at least one inflow line and the at least one outflow line may be arranged outside as well as below the heat exchanger device.

19 Claims, 4 Drawing Sheets

(51) Int. Cl.
*F28F 9/02* (2006.01)
*F01M 11/03* (2006.01)
*B01D 35/18* (2006.01)
*B01D 35/00* (2006.01)
*F01M 1/02* (2006.01)
*F01M 5/00* (2006.01)
*F28D 21/00* (2006.01)

(52) U.S. Cl.
CPC ............ *F01M 5/002* (2013.01); *F01M 11/03* (2013.01); *F28F 9/0075* (2013.01); *F28F 9/0251* (2013.01); *F28F 9/0253* (2013.01); *F01M 2011/033* (2013.01); *F28D 2021/0089* (2013.01); *F28F 2280/06* (2013.01)

(58) Field of Classification Search
CPC ............ F01M 2011/033; F28F 9/0075; F28F 9/0251; F28F 9/0253; F28F 2280/06; F28D 2021/0089
See application file for complete search history.

(56) References Cited

U.S. PATENT DOCUMENTS

| | | | |
|---|---|---|---|
| 5,896,834 A | 4/1999 | Gruner | |
| 5,964,283 A | 10/1999 | Pavlin | |
| 6,267,094 B1 | 7/2001 | Kuettner et al. | |
| 7,353,794 B2 * | 4/2008 | Gruner | B01D 35/18 123/196 AB |
| 7,748,442 B2 | 7/2010 | Kalbacher et al. | |
| 8,186,328 B2 * | 5/2012 | Kiemlen | F01M 5/002 123/196 AB |
| 8,783,216 B2 | 7/2014 | Wilmink et al. | |
| 2005/0274504 A1 * | 12/2005 | Torigoe | F28D 1/0325 165/153 |
| 2010/0000708 A1 | 1/2010 | Kiemlen et al. | |
| 2012/0061048 A1 * | 3/2012 | Ohi | F01M 5/002 165/51 |
| 2013/0319634 A1 | 12/2013 | Sheppard et al. | |
| 2015/0129164 A1 | 5/2015 | Ollier | |
| 2016/0101380 A1 * | 4/2016 | Pereira Madeira | B01D 46/0041 55/503 |

FOREIGN PATENT DOCUMENTS

| | | |
|---|---|---|
| DE | 19739668 A1 | 3/1999 |
| DE | 19828029 A1 | 12/1999 |
| EP | 1559980 A1 | 8/2005 |
| EP | 1780384 A2 | 5/2007 |
| EP | 1782876 A1 | 5/2007 |
| GB | 2112918 A | 7/1983 |
| JP | S56-110512 A | 9/1981 |
| JP | H9-511306 A | 11/1997 |
| JP | H11-506532 A | 6/1999 |
| JP | 2008-506069 A | 2/2008 |
| JP | 2008-533368 A | 8/2008 |

OTHER PUBLICATIONS

English abstract for EP-1780384.
English abstract for EP-1782876.
Japanese Office Action for JP-2018-531619, dated Sep. 11, 2018.

* cited by examiner

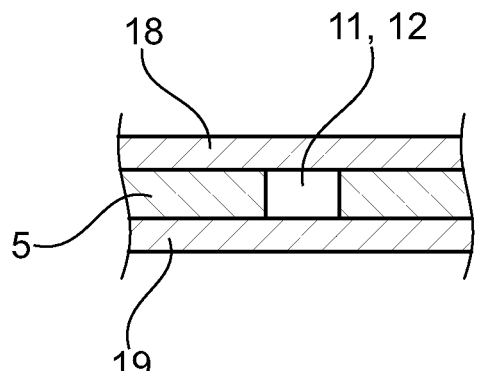
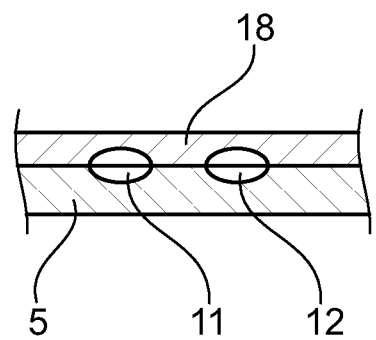
Fig. 6a    Fig. 6b
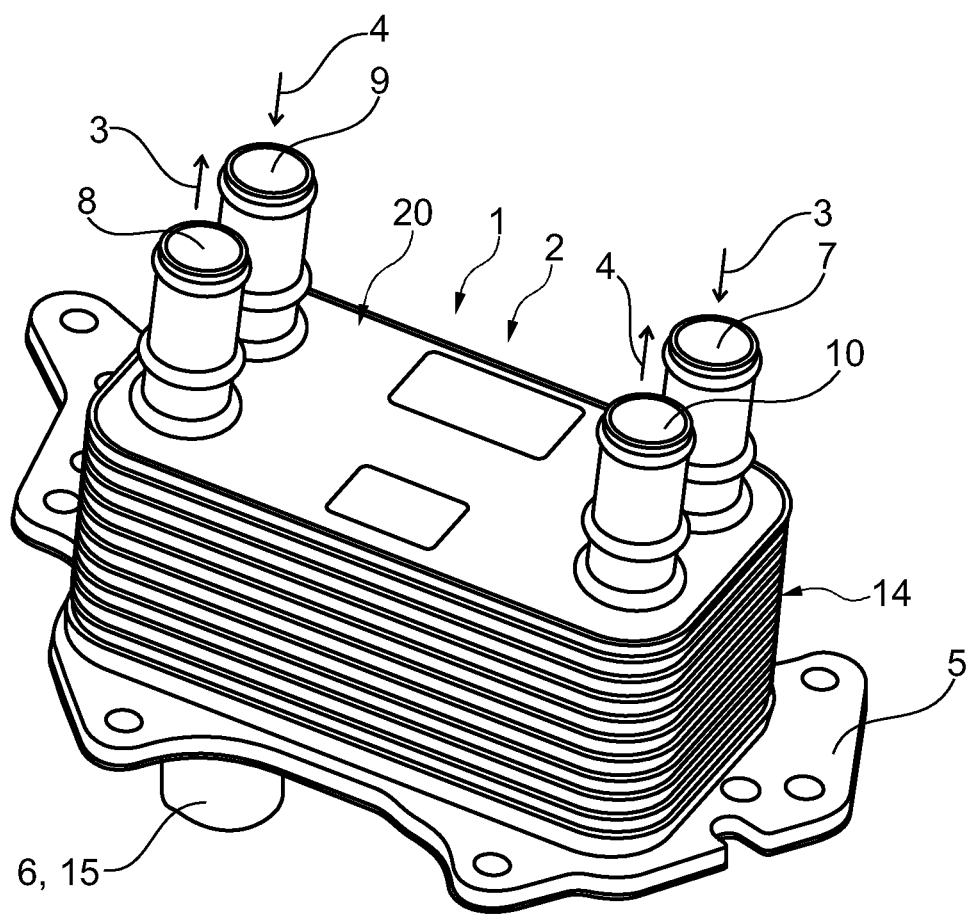
Fig. 7

HEAT EXCHANGER MODULE

CROSS-REFERENCE TO RELATED APPLICATIONS

This application claims priority to International Patent Application No. PCT/EP2016/076069 filed on Oct. 28, 2016, and German Application No. 10 2015 221 528.8 filed on Nov. 3, 2015, the contents of both of which are hereby incorporated by reference in their entirety.

TECHNICAL FIELD

The present invention relates to a heat exchanger module comprising a heat exchanger device for controlling the temperature of a fluid by means of a heat transfer medium. The invention also relates to an internal combustion engine comprising at least one such heat exchanger module.

BACKGROUND

A generic heat exchanger module comprising a plate heat exchanger, which is embodied as transmission oil cooler, is known from EP 1 559 980 B1, in which the transmission oil is in heat exchange with a liquid. Provision is furthermore made for at least one base plate comprising a conversion duct and a transfer duct, wherein a thermostat control valve is arranged in a housing on the conversion duct of the base plate, the thermostat of which comes into contact with the one medium, preferably oil, via a recess in the conversion duct.

A heat exchanger comprising flat tubes, which are oriented parallel to one another, comprising gap-like hollow spaces arranged therebetween, in which turbulence inserts of the common type are arranged, is known from DE 198 28 029 A1.

A plate heat exchanger comprising a plurality of plates, which are stacked on top of one another and which are embodied in parallel and in a bowl-like manner, which stretch flow areas for at least two media is known from AT 506 972 A1. Provision is also made for a connecting element for accommodating at least one fitting in the area of an end plate, which is preferably embodied in a bowl-like manner, wherein the fitting is arranged on a section of the connecting element, which cantilevers with respect to the plates. Known heat exchanger modules, which are embodied as oil coolers, for example, are typically integrated into an oil circuit, into which a filter device is usually integrated as well. Even so-called combined cooling modules, which, in addition to the cooling device, also have a filter device, are frequently used thereby. A supply and disposal of the cooling device by means of fluid to be cooled and coolant thereby occurs in the known manner via the base plate, while a supply and outlet line of the filter device were installed as separate lines, but which is comparatively extensive and expensive.

SUMMARY

The present invention thus deals with the problem of specifying an improved or at least an alternative embodiment for a heat exchanger module of the generic type, which is in particular cost-efficient.

According to the invention, this problem is solved by means of the subject matter of the independent claim(s). Advantageous embodiments are the subject matter of the dependent claim(s).

The present invention is based on the general idea of additionally arranging at least one further additional unit on a base plate of a heat exchanger device to control the temperature of a fluid by means of a heat transfer medium and to supply and dispose of the at least one additional unit via the base plate, whereby in particular separate supply and disposal lines, such as inflow and outflow lines, which had to always be installed separately and thus in an extensive and expensive manner to date, can be forgone. The heat exchanger device of the heat exchanger module is thereby supplied and disposed of via the base plate. The heat exchanger module according to the invention thereby has the mentioned heat exchanger device for controlling the temperature of a fluid, for example of an oil, by means of a heat transfer medium, wherein not only the heat exchanger device is arranged on the base plate, but, according to the invention, additionally also at least one additional unit. According to the invention, at least one inflow line and/or an outflow line of the at least one additional unit are now arranged in the base plate. This means that at least the one additional unit can be supplied and disposed of completely with the respective medium via the base plate, whereby in particular a line guide for the additional unit, which is required to date, can be forgone. According to the invention, at least the following ducts are simultaneously arranged in the base plate: an inflow and/or an outflow for the fluid, which is to be temperature-controlled, and an inflow and/or an outflow for the heat transfer medium, for example coolant, wherein the inflow line and the outflow line of the at least one additional unit in the base plate are fluidically separated from the inflow and from the outflow of the heat exchanger device. This means that the heat exchanger device as well as the at least one additional unit can be supplied and disposed of at least partially, preferably completely, with the respective media via the base plate, namely independently of the guided fluid, wherein in particular a separate line guide, which is required to date, for the additional unit, which can for example be embodied as oil pump or as filter device, can be forgone. The heat exchanger module according to the invention, however, thereby does not only provide the large advantage of being capable of being produced more cost-efficiently, but it simultaneously also represents an installation space-minimizing embodiment, whereby a heat exchanger module of a particularly compact design, comprising an additional unit can be created, which is highly advantageous, in particular under the aspect of the confined installation space conditions in modern engine compartments.

In an advantageous further development of the solution according to the invention, the heat exchanger device is embodied as plate heat exchanger, in particular as oil cooler. Such a plate heat exchanger has a plurality of heat exchanger plates, which are stacked on top of one another and which alternately form a duct system for the heat transfer medium and for the fluid, which is to be temperature-controlled, for example oil. They are connected to the base plate, for example soldered thereto, by means of an exterior plate, for example a cover plate. Such plate heat exchangers are in particular used in a variety of ways to cool oil in modern motor vehicles. Due to their high performance, due to the large heat transfer surface, even plate heat exchangers of a comparatively compact design are able to cool fluids effectively.

In a further advantageous embodiment of the solution according to the invention, the additional unit is embodied as pump or as adapter fitting, which can be in contact with a pump or another additional unit. Such a pump/adapter fitting, which is embodied for example as oil pump or as coolant pump, was arranged separately to date and thus also required separate supply and disposal lines as well as connections, which are in each case designed for this purpose. Due to the integration of the inflow and outflow line of the pump into the base plate/adapter fitting, it is not only possible to create an installation space-optimized solution, but it is also possible to avoid the external installation of lines, which was thus extensive and expensive to date.

In an advantageous further development of the solution according to the invention, a first wall area, in particular in the manner of a chamfer, of the inflow line and/or of the outflow line of the at least one additional unit is integrated into the base plate, wherein a second wall area, which completes the inflow line and/or the outflow line, is formed by the heat exchanger device, in particular a heat exchanger plate thereof. Not only the inflow and outflow line of the at least one additional unit can thus be provided in the base plate, but simultaneously also inflow and outflow openings for the fluid, which is to be temperature-controlled, and the heat transfer medium of the heat exchanger device, wherein provision can be made for chamfer-like depression in the base plate for it, which, together with the adjacent heat exchanger plate of the heat exchanger device, form the cross section of the inflow or outflow line, respectively. An inflow or outflow line, which runs parallel to the plane of the base plate and simultaneously in the latter can also be realized through this.

In an advantageous further development of the solution according to the invention, the heat exchanger device and the at least one additional aggregate are arranged on opposite sides of the base plate. It goes without saying that it is also conceivable in the alternative that the heat exchanger device as well as the at least one additional unit are arranged on the same side of the base plate, depending on which installation space requirements need to be met by the heat exchanger module. Regardless of the arrangement of the at least one additional unit, it is possible by means of the base plate according to the invention to realize a flexible heat exchanger module, which simultaneously has a compact design, comprising an additional unit.

Further important features and advantages of the invention follow from the subclaims, from the drawings and from the corresponding figure description by means of the drawings.

It goes without saying that the above-mentioned features and the features, which will be described below, cannot only be used in the respective specified combination, but also in other combinations or alone, without leaving the scope of the present invention.

BRIEF DESCRIPTION OF THE DRAWINGS

Preferred exemplary embodiments of the invention are illustrated in the drawings and will be described in more detail in the description below, whereby identical reference numerals refer to identical or similar or functionally identical components.

In each case schematically,

FIGS. 6a and 6b show different options for the duct formation, FIG. 7 shows a heat exchanger, which is not in accordance with the invention, in which an inflow/outflow with/of coolant and cooling medium occurs via a cover plate.

DETAILED DESCRIPTION

Figure 1:
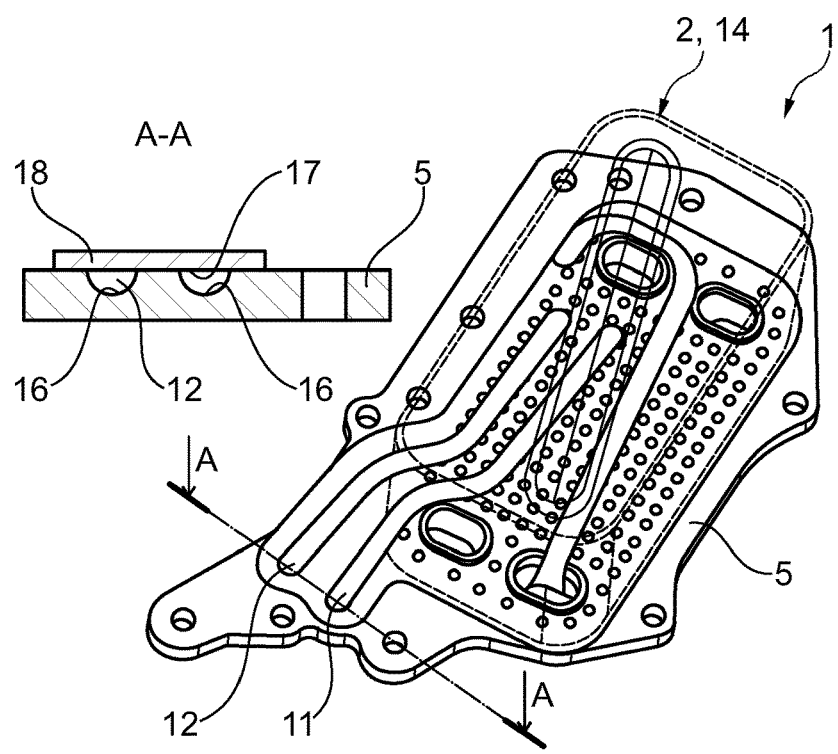
FIG. 1 shows a partially transparent view onto a heat exchanger module according to the invention comprising a heat exchanger device.
Figure 2:
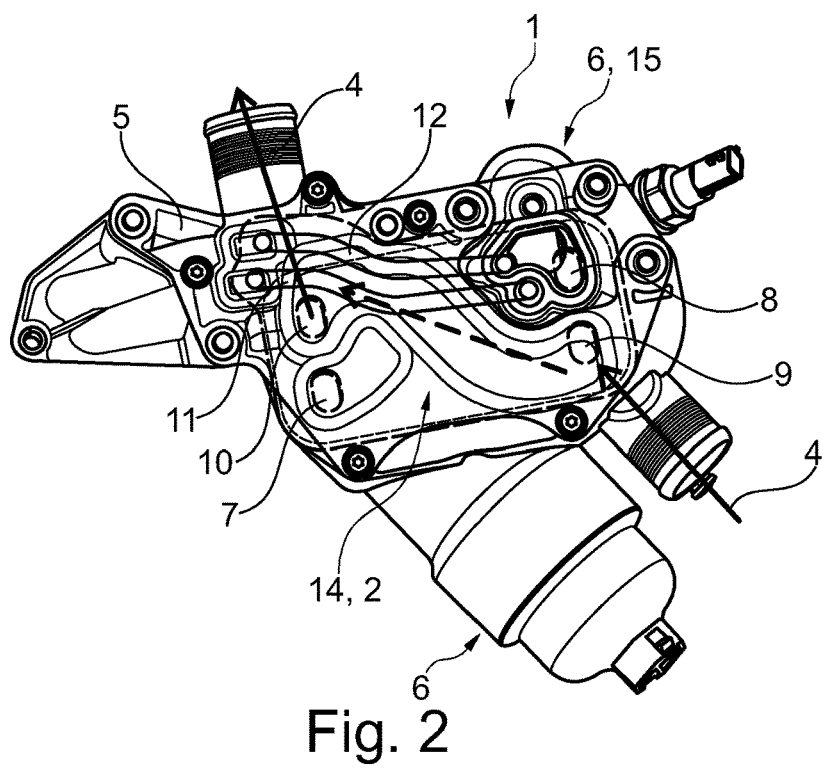
FIG. 2 shows a further possible embodiment of the heat exchanger module according to the invention comprising a heat exchanger device, filter device and pump/adapter fitting comprising an additionally illustrated heat transfer medium flow.
Figure 3:
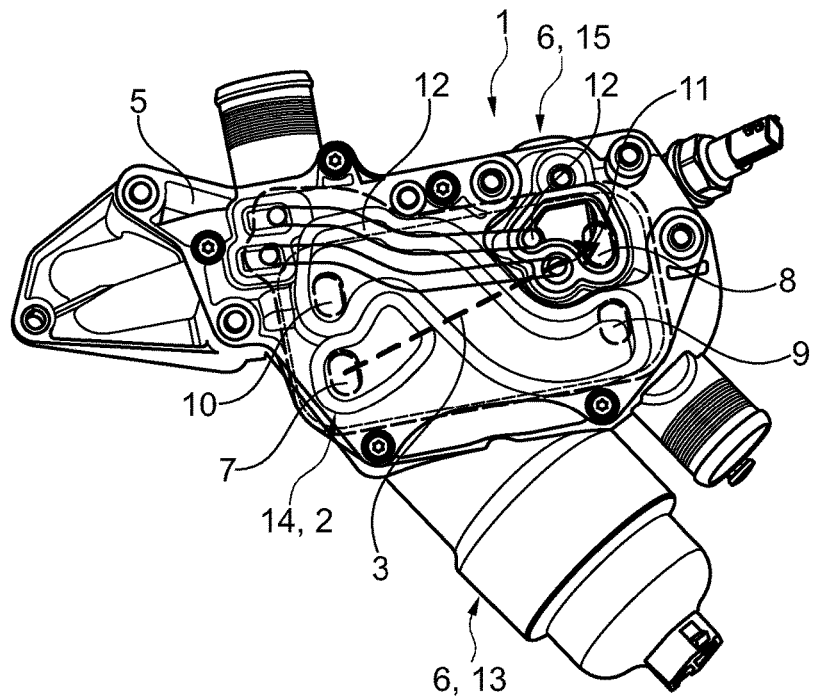
FIG. 3 shows an illustration as in FIG. 2, but with illustrated fluid flow.
Figure 4:
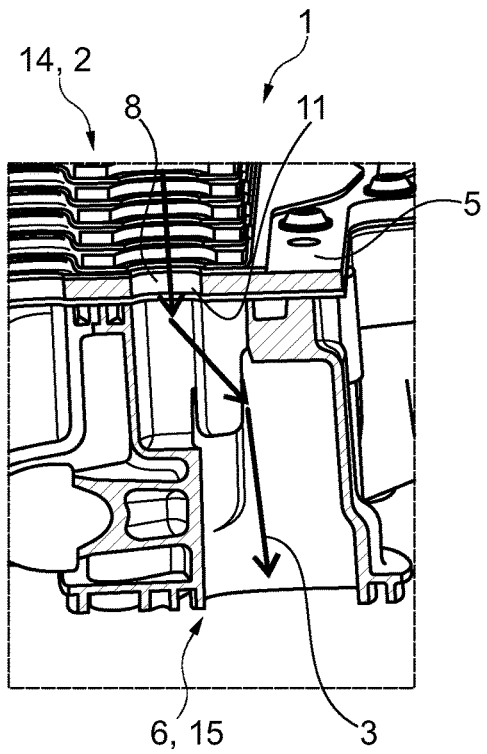
FIG. 4 shows a sectional illustration through the heat exchanger module according to the invention in the area of the base plate and the pump/adapter fitting or heat exchanger device, respectively, connected thereto.
Figure 5:
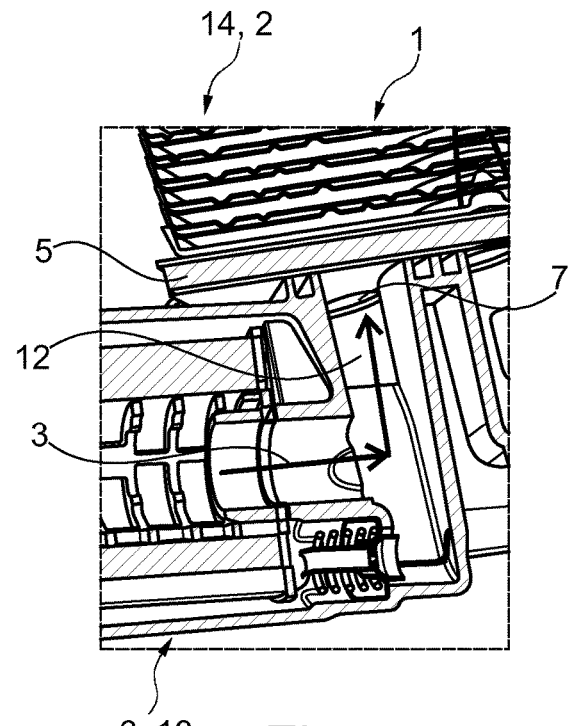
FIG. 5 shows a sectional illustration through the heat exchanger module according to the invention in the area of the base plate comprising connected heat exchanger device and filter device.

According to FIGS. 1 to 5 and 7 to 9, a heat exchanger module 1 according to the invention has a heat exchanger device 2 for controlling the temperature of a fluid 3, for example oil, by means of a heat transfer medium 4, for example coolant, wherein the heat exchanger device 2 has a base plate 5. According to the invention at least one additional unit 6 is now arranged on this base plate 5, wherein at least one inflow line 11 and/or an outflow line 12 of the at least one additional unit 6 are/is additionally provided in the base plate 5 (see FIGS. 7 to 9). In the case of the heat exchanger 1 according to FIGS. 1 to 5, an inflow 7 and an outflow 8 for the fluid 3, which is to be temperature-controlled, as well as an inflow 9 and an outflow 10 for the heat transfer medium 4 are additionally also arranged in the base plate 5, which are embodied fluidically separated from the at least one inflow line 11 and the at least one outflow line 12 of the at least one additional unit 6.

Figure 8:
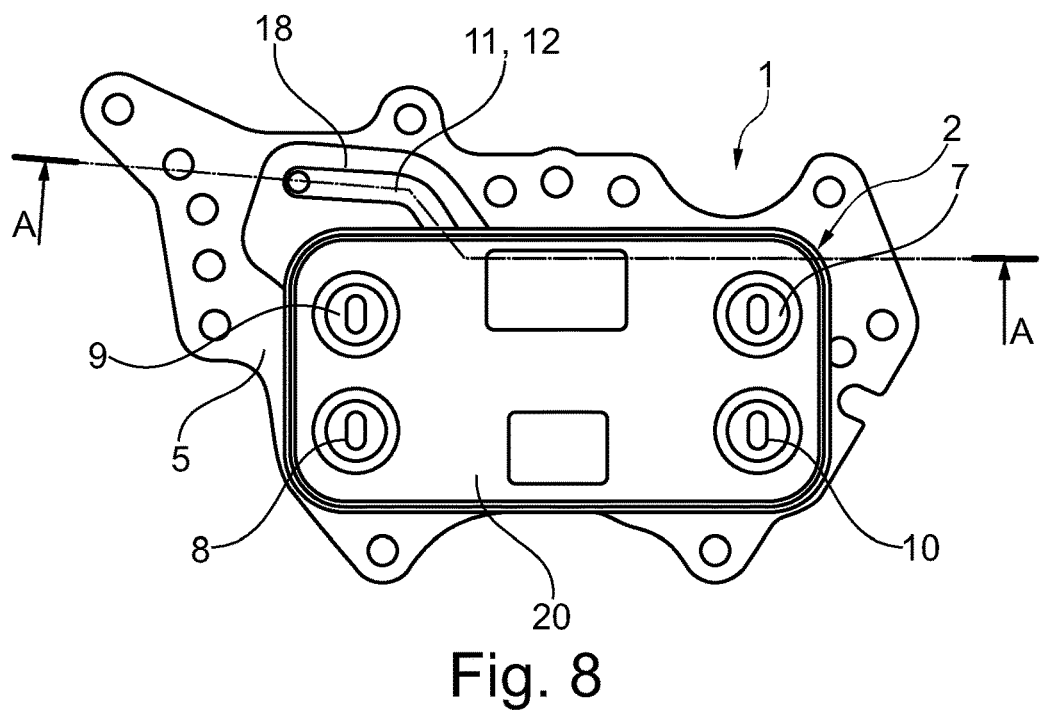
FIG. 8 shows a top view onto the heat exchanger according to FIG. 7.
Figure 9:
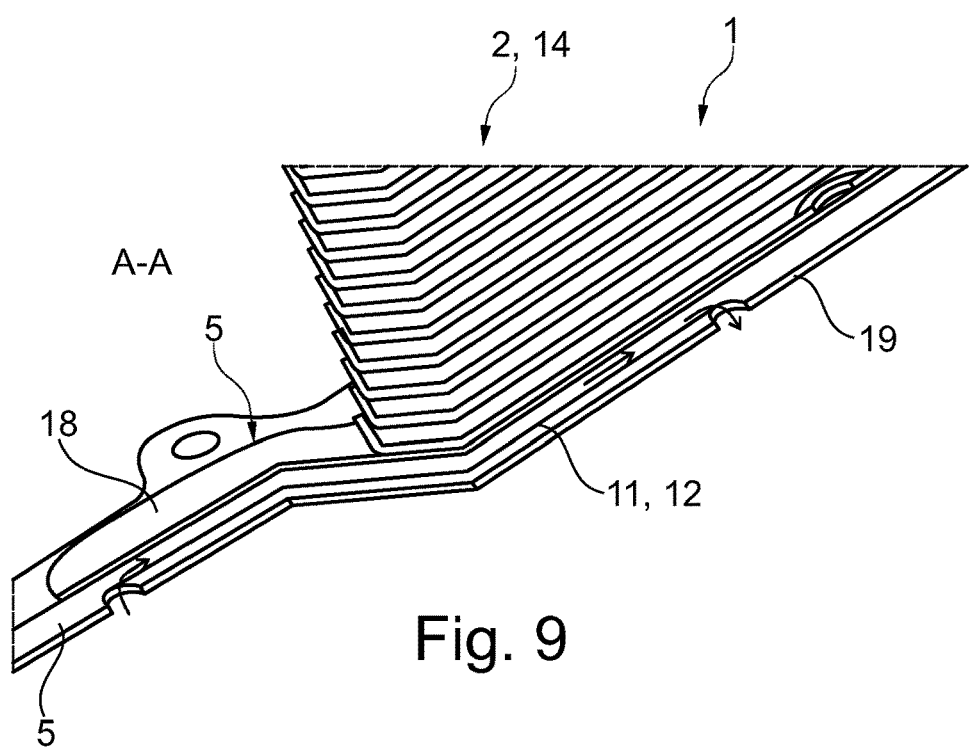
FIG. 9 shows a sectional illustration along the sectional plane A-A.

In the case of the heat exchanger 1 according to FIGS. 7 to 9, the inflow 7 and the outflow 8 for the fluid 3, which is to be temperature-controlled, as well as the inflow 9 and an outflow 10 for the heat transfer medium 4 are arranged in a cover plate 20.

The additional unit 6 can for example be embodied as filter device 13, in particular as oil filter, as pump, as holder comprising duct guide for the additional unit (6), as distributor device, as valve device or as a crankcase. The heat exchanger device 2, in turn, can be embodied as plate heat exchanger 14, in particular as oil cooler. In addition or in the alternative, an additional unit 6 can also be embodied as pump 15. This pump 15 can for example be embodied as oil pump or as coolant pump. The base plate 5 itself is thereby preferably embodied as die cast component or as punched component made of metal, but, in the alternative, can obviously also be embodied as plastic injection molded part.

A realization of the inflow line 11 and/or of the outflow line 12 is realized by means of a constructed duct cross section, wherein a first wall area 16, in particular in the manner of a chamfer, the inflow line 11 and/or the outflow line 12 of the at least one additional unit 6 is integrated into the base plate 5, and wherein a second wall area 17 (see FIG. 1), which completes the inflow line 11 and/or the outflow line 12 is formed by the heat exchanger device 2, in particular a heat exchanger plate 18, of the heat exchanger device 2, which is embodied as stacked plate cooler.

When looking in particular at the illustration in FIGS. 2 to 5 and 7, it can be seen that the heat exchanger device 2 and the at least one additional unit 6 are arranged on opposite sides of the base plate 5, whereby it goes without saying that the arrangement of at least one additional unit 6 on the same side of the base plate 5, such as the heat exchanger device 2, is also possible in the alternative or in addition. The at least one additional unit 6 thereby preferably has a housing made of plastic.

The inflow line 11 and the outflow line 12 in the base plate 5 can thereby be formed in several ways, namely
- of a two-part setup of a heat exchanger plate 18, which is embodied as cover plate (see FIG. 1), or
- of a three-part setup comprising a lower end plate 19, base plate 5 comprising ducts, which are open towards both sides, and heat exchanger plate 18, which is embodied as cover plate (see FIG. 6a),
- of the heat exchanger plate 18, which is embodied as cover plate, comprising integrated ducts and the additional unit 6 or a further component, respectively (see FIG. 6b) as closure.

Due to the at least partial integration of the inflow line 11 and of the outflow line 12 of the additional unit 6 into the base plate 5 of the heat exchanger device 2 or of the heat exchanger module 1, the lines, which are extensive and expensive to date at this location can be integrated into the entire heat exchanger module unit in a cost-efficient and also place-optimized manner. In addition, larger structural freedoms are created to provide corresponding ducts or connections respectively. A further cost reduction is made possible by simple geometry in the area of the filter device 13, less complex tools, installation space-friendly design of the heat exchanger module and in particular a massive elimination of components, which are required to date, such as, for example, seals, lines and intermediate pieces.

The invention claimed is:

1. A heat exchanger module comprising:
   a heat exchanger for controlling the temperature of a fluid via a heat transfer medium, the heat exchanger arranged on a base plate;
   at least one additional unit arranged on the base plate, the at least one additional unit structured as at least one of a pump and a filter device;
   a fluid inflow duct and a fluid outflow duct disposed in the base plate through which the fluid is flowable;
   a medium inflow duct and a medium outflow duct disposed in the base plate through which the heat transfer medium is flowable;
   wherein the at least one additional unit includes at least one inflow line and at least one outflow line disposed in the base plate and fluidically separated within the base plate from the fluid inflow duct, the medium inflow duct, the fluid outflow duct, and the medium outflow duct;
   wherein the at least one inflow line and the at least one outflow line are arranged outside as well as below the heat exchanger; and
   wherein the at least one inflow line and the at least one outflow line are at least partially integrated into the base plate without being in fluid communication with the fluid inflow duct, the medium inflow duct, the fluid outflow duct, and the medium outflow duct.

2. The heat exchanger module according to claim 1, wherein an internal surface of at least one of the at least one inflow line and the at least one outflow line is provided by a first wall area integrated into the base plate and a second wall area of the heat exchanger.

3. The heat exchanger module according to claim 1, wherein the at least one of the pump and the filter device includes the pump, and wherein the pump is structured as at least one of an oil pump and a coolant pump.

4. The heat exchanger module according to claim 1, wherein the base plate is structured as one of 1) a die cast component, 2) a punched component, and 3) a plastic injection molded part.

5. The heat exchanger module according to claim 1, wherein the heat exchanger is a plate heat exchanger.

6. The heat exchanger module according to claim 1, wherein the heat exchanger and the at least one additional unit are arranged on opposite sides of the base plate.

7. The heat exchanger module according to claim 1, wherein the at least one additional unit includes a plastic housing.

8. An internal combustion engine comprising at least one heat exchanger module including:
   a heat exchanger arranged on a base plate and configured to control the temperature of a fluid via a heat transfer medium;
   at least one additional unit arranged on the base plate and structured as at least one of a pump and a filter device;
   a fluid inflow duct and a fluid outflow duct disposed in the base plate through which the fluid is flowable; and
   a medium inflow duct and a medium outflow duct disposed in the base plate through which the heat transfer medium is flowable;
   wherein the at least one additional unit includes at least one inflow line and at least one outflow line disposed in the base plate and fluidically separated within the base plate from the fluid inflow duct, the medium inflow duct, the fluid outflow duct, and the medium outflow duct;
   wherein the base plate includes a first wall area and the heat exchanger includes a second wall area, the first wall area and the second wall area together providing at least one of the at least one inflow line and the at least one outflow line;
   wherein the at least one inflow line and the at least one outflow line are arranged outside as well as below the heat exchanger; and
   wherein the at least one inflow line and the at least one outflow line are at least partially integrated into the base plate without being in fluid communication with the fluid inflow duct, the medium inflow duct, the fluid outflow duct, and the medium outflow duct.

9. The internal combustion engine according to claim 8, wherein the first wall area and the second wall area together define a flow cross-sectional area of the at least one of the at least one inflow line and the at least one outflow line.

10. The internal combustion engine according to claim 8, wherein the at least one of the pump and the filter device includes the pump, and wherein the pump is structured as at least one of an oil pump and a coolant pump.

11. The internal combustion engine according to claim 8, wherein the base plate is structured as one of 1) a die cast component, 2) a punched component, and 3) a plastic injection molded part.

12. The internal combustion engine according to claim 8, wherein the heat exchanger and the at least one additional unit are arranged on sides of the base plate facing opposing directions.

13. The heat exchanger module according to claim 2, wherein the first wall area is structured as a chamfer.

14. The heat exchanger module according to claim 2, wherein the second wall area is defined by a heat exchanger plate of the heat exchanger.

15. The heat exchanger module according to claim 1, wherein an interior surface of at least one of the at least one inflow line and the at least one outflow line is provided by a first wall area and a second wall area, the first wall area structured as a chamfer of the base plate, and the second wall area provided by a heat exchanger plate of the heat exchanger.

16. The heat exchanger module according to claim 1, wherein the heat exchanger and the at least one additional unit are arranged on sides of the base plate facing opposing directions.

17. The heat exchanger module according to claim 5, wherein the plate heat exchanger is an oil cooler.

18. The heat exchanger module according to claim 1, wherein the base plate includes a first wall area and the heat exchanger includes a second wall area, and wherein the heat exchanger is arranged on the base plate such that the first wall area and the second wall area contact one another and together provide a flow cross-sectional area of at least one of the at least one inflow line and the at least one outflow line.

19. The heat exchanger module according to claim 1, further comprising a lower end plate arranged on a side of the base plate facing away from the heat exchanger, wherein the base plate, the lower end plate, and the heat exchanger together provide a flow cross-sectional area of at least one of the at least one inflow line and the at least one outflow line.

* * * * *